(Model.)
J. G. HEROLD.
Nut Lock.
No. 234,127.  Patented Nov. 9, 1880.
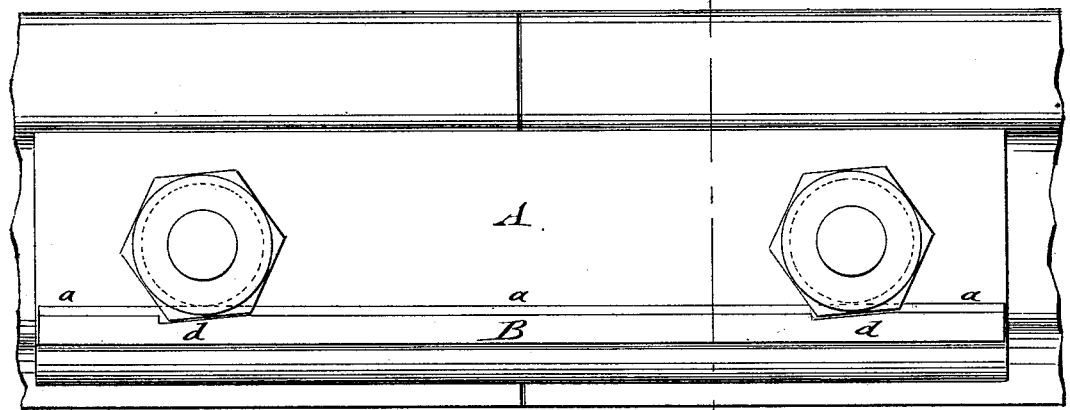
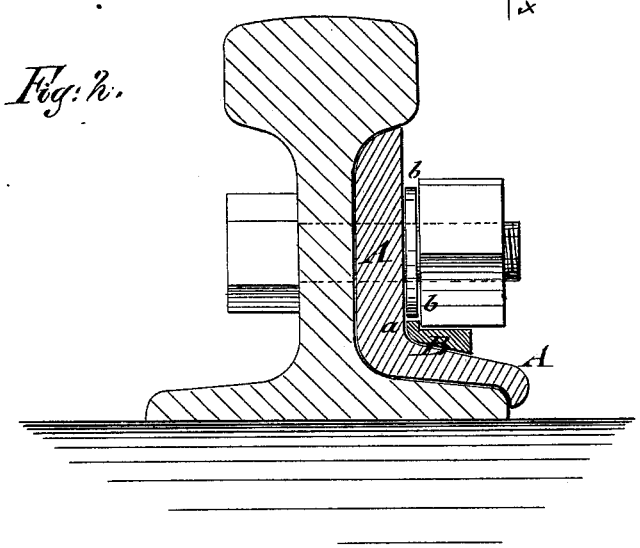
WITNESSES:
INVENTOR:
J. G. Herold
BY Munn & Co
ATTORNEYS.

UNITED STATES PATENT OFFICE.

JOHN G. HEROLD, OF MOBERLY, MISSOURI.

NUT-LOCK.

SPECIFICATION forming part of Letters Patent No. 234,127, dated November 9, 1880.

Application filed March 3, 1880. (Model.)

*To all whom it may concern:*

Be it known that I, JOHN G. HEROLD, of Moberly, in the county of Randolph and State of Missouri, have invented a new and Improved Nut-Lock, of which the following is a specification.

In the accompanying drawings, Figure 1 represents a side view of a rail-joint with my improved nut-lock, and Fig. 2 a vertical transverse section of the same on line $x\ x$, Fig. 1.

Similar letters of reference indicate corresponding parts.

This invention refers to an improved nut-lock for railroad-rail joints, by which the nuts are prevented, in simple and reliable manner, from becoming loose and dropping off owing to the jar of the engines and cars passing over the rails; and the invention consists of a flanged locking strip or piece with beveled under side that is fitted into the angle of the fish-bar. The flange extends up between the fish-bar and inner face of the nuts into the space formed by the interposed washers of the nuts, while the top of the locking-strip in front of the flange is notched below the nuts for retaining the corners of the same.

Referring to the drawings, A represents a fish bar or plate that extends by an angular portion over the base of the rail, and B is a straight piece or strip of rolled iron or other material of the length of the fish-plate. The locking-strip B is beveled at the under side and fitted to the angle of the fish-bar below the nuts. The piece B is made with a flange, $a$, at the inner side, that extends up between the inner face of the nuts and the fish-plate into a space formed either by a washer, $b$, of corresponding thickness or by a round shoulder forged onto the inner face of the nut. The contact of the flange with the nuts prevents the strip B from becoming loose and falling out of place. On the top of the strip, in front of the flange and below the nuts, are notches or grooves $d$, into which the corners of the nut fit so as to prevent them from working out of place by the jars of the rails.

The nut-lock is applied by first screwing up the nuts tight on the bolts, but leaving the lower side of the nut parallel with the bar or rail, and sliding then the locking-strip under the nuts at the angle of the fish-plate, with the flange fitting behind the nuts. The nuts are then turned slightly backward until the corner of the nut drops into the notch or groove on the upper side of the strip, which will hold the nuts in proper place.

The locking-strip can be used with nuts of four, six, or eight sides, as the grooved top locks them firmly while the flange and space back of the nuts retain the strip in position on the fish-plate, the strip forming thus a cheap, durable, and reliable nut-lock for bolts of rail-joints and other bolts exposed to jars and vibrations.

Having thus fully described my invention, I claim as new and desire to secure by Letters Patent—

The combination, with the nuts, bolts, and fish-plate A, of the beveled locking-strip B, having flange $a$, and the washer $b$, as and for the purpose specified.

JOHN GEORGE HEROLD.

Witnesses:
JOHN H. GRAVLEY,
JAS. R. LOWELL.